US007278012B2

(12) United States Patent
Sartorius et al.

(10) Patent No.: US 7,278,012 B2
(45) Date of Patent: Oct. 2, 2007

(54) METHOD AND APPARATUS FOR EFFICIENTLY ACCESSING FIRST AND SECOND BRANCH HISTORY TABLES TO PREDICT BRANCH INSTRUCTIONS

(75) Inventors: Thomas Andrew Sartorius, Raleigh, NC (US); Brian Michael Stempel, Raleigh, NC (US); Jeffrey Todd Bridges, Raleigh, NC (US); James Norris Dieffenderfer, Apex, NC (US); Rodney Wayne Smith, Raleigh, NC (US)

(73) Assignee: QUALCOMM Incorporated, San Diego, CA (US)

( * ) Notice: Subject to any disclaimer, the term of this patent is extended or adjusted under 35 U.S.C. 154(b) by 222 days.

(21) Appl. No.: 11/144,206

(22) Filed: Jun. 2, 2005

(65) Prior Publication Data

US 2006/0277397 A1    Dec. 7, 2006

(51) Int. Cl.
G06F 9/42 (2006.01)
(52) U.S. Cl. .................................................. 712/240
(58) Field of Classification Search ................. 712/233, 712/234, 238, 239, 240
See application file for complete search history.

(56) References Cited

U.S. PATENT DOCUMENTS

| 5,353,421 | A | * | 10/1994 | Emma et al. | ............... 712/240 |
| 5,515,518 | A | * | 5/1996 | Stiles et al. | ............... 712/239 |
| 6,374,349 | B1 | * | 4/2002 | McFarling | .................. 712/239 |
| 6,550,004 | B1 | * | 4/2003 | Henry et al. | ............... 712/239 |
| 2002/0194464 | A1 | * | 12/2002 | Henry et al. | ............... 712/239 |
| 2004/0015683 | A1 | * | 1/2004 | Emma et al. | ............... 712/240 |

OTHER PUBLICATIONS

Driesen et al., "The Cascaded Predictor: Economical and Adaptive Branch Target Prediction," IEEE, 1998, pp. 249-258.*
Song et al. "The PowerPC 604 RISC Microprocessor," IEEE, 1994, pp. 8-17.*

* cited by examiner

Primary Examiner—Eddie Chan
Assistant Examiner—David J. Huisman
(74) Attorney, Agent, or Firm—Nicholas J. Pauley; Joseph B. Agusta; John L. Ciccozzi

(57) ABSTRACT

A microprocessor includes two branch history tables, and is configured to use a first one of the branch history tables for predicting branch instructions that are hits in a branch target cache, and to use a second one of the branch history tables for predicting branch instructions that are misses in the branch target cache. As such, the first branch history table is configured to have an access speed matched to that of the branch target cache, so that its prediction information is timely available relative to branch target cache hit detection, which may happen early in the microprocessor's instruction pipeline. The second branch history table thus need only be as fast as is required for providing timely prediction information in association with recognizing branch target cache misses as branch instructions, such as at the instruction decode stage(s) of the instruction pipeline.

22 Claims, 3 Drawing Sheets

METHOD AND APPARATUS FOR EFFICIENTLY ACCESSING FIRST AND SECOND BRANCH HISTORY TABLES TO PREDICT BRANCH INSTRUCTIONS

BACKGROUND

1. Field of the Invention

The present invention generally relates to microprocessors, and particularly relates to branch predicting microprocessors.

2. Relevant Background

Pipelined microprocessors commonly use branch prediction to avoid stalling their instruction pipelines while waiting to determine whether conditional branch instructions should be taken. Branch prediction mechanisms allow such microprocessors to "guess" as to whether conditional branch instructions will be taken or not taken, in advance of actually evaluating their branch conditions.

A common branch prediction method relies on maintaining a branch history table that includes a number of saturated counters, or other tracking indicators, that provide branch prediction information. As one example, a two-bit saturated counter counts up to a maximum value of 11, and down to a minimum value of 00, where the value 11 represents strongly taken, 10 represents weakly taken, 01 represents weakly not taken, and 00 represents strongly not taken. Such counters may be maintained dynamically based on run-time heuristics, such as the microprocessor tracking past branch behaviors.

Because the actual performance gains obtained through branch prediction depend on branch prediction accuracies, different counters may be used for different instruction address ranges, such that the indicator state of each counter better reflects the taken/not-taken behavior of branch instructions within a narrower instruction address range. Improving prediction accuracy in this manner can lead to the use of a relatively large number of counters, since each counter provides a branch predictor for a relatively small instruction address range. Thus, branch history tables may be relatively large, and indexing into them may require decoding a significant number of instruction address bits to identify the relatively narrow instruction address range involved.

The attendant delays limit the ability to realize further branch prediction performance gains through the use of branch target address caches (or, equivalently, branch target instruction caches). Such branch target caches hold the instruction addresses of previously recognized branch instructions, e.g., branch instructions that were previously fetched, decoded, and identified as branch instructions by the microprocessor, and branch instructions can be detected before decoding by comparing the instruction address of each newly fetched instruction to the branch target cache contents. A branch target cache "hit" indicates that the instruction address corresponds to a previously recognized branch, while a branch target cache "miss" indicates that the instruction is not a previously recognized branch, meaning that the microprocessor must wait until the instruction decoding stage to determine whether the instruction is a branch instruction.

Thus, branch instructions that are branch target cache hits may be predicted as taken or not taken without waiting for instruction decoding. However, the ability to make such predictions using the branch history table depends on the table information being available in the same amount of time that it takes to detect branch target cache hits. Large branch history tables generally are not accessible quickly enough for use in predicting branch target cache hits.

The unavailability of timely prediction information forces microprocessors to adopt other approaches. In one alternative approach, branch instructions that are branch target cache hits are assumed always taken, i.e., the "prediction" is fixed as taken. Such approaches can lead to mispredictions a significant number of times. Another alternative is to speed up the branch history table, typically by making it small enough to be accessible early in the instruction pipeline's fetch stage(s), so that prediction information is available before instruction decoding. However, shrinking the branch history table in this manner generally reduces prediction accuracies because the same predictor (or predictors) is used to predict branches over a wider range of instruction addresses.

SUMMARY OF THE DISCLOSURE

In one or more embodiments, a microprocessor uses a first branch history table to predict branch instructions that are branch target cache hits, and uses a second branch history table to predict branch instructions that are branch target cache misses. The first branch history table is configured to have an access speed matched to that of the branch target cache, so that its prediction information is available early in the microprocessor's instruction pipeline, where branch target cache hits and misses are detected. Because its prediction information is not needed until later in the pipeline, the second branch history table does not need to be as fast as the first branch history table. That fact allows significant flexibility in configuring the size and accuracy of the second branch history table.

The microprocessor may include a branch prediction circuit that is configured to direct instruction fetching from an instruction cache for the instruction pipeline of the microprocessor based on predicting branch instructions fetched into the instruction pipeline as taken or not taken. One embodiment of the branch prediction circuit comprises a branch target cache configured to store branch target information for known branch instructions, a first branch history table configured to store first branch prediction information, a second branch history table configured to store second branch prediction information, and branch control logic. The branch control logic may be configured to predict branch instructions as taken or not taken according to the first branch prediction information for branch instructions that are branch target cache hits, and according to the second branch prediction information for branch instructions that are branch target cache misses.

In one embodiment, the first branch history table is configured to have an access speed matched to that of the branch target cache, and the second branch history table is configured to have an access speed matched to that of the instruction cache. More generally, the first branch history table is configured such that its branch prediction information is available in conjunction with detecting branch target cache hits, e.g., early in the fetch stage(s) of the instruction pipeline, while the second branch history table is configured such that its branch prediction information is available in conjunction with recognizing branch instructions, e.g., later in the decode stage(s) of the instruction pipeline.

The above microprocessor may embody one or more variations of the method of predicting branch target cache hits using the first branch history table, and predicting branch target cache misses using the second branch history table. For example, the microprocessor may be configured to make initial predictions for branch target cache hits according to the first branch prediction information, and configured to make corresponding subsequent predictions for the branch target cache hits according to the second branch prediction information. Thus, the microprocessor may be configured to direct instruction fetching according to the initial predictions, and conditionally redirect instruction fetching according to the corresponding subsequent predictions. That is, since the second branch history table can be larger (and more accurate) than the first branch history table, the microprocessor may redirect instruction fetching if the corresponding subsequent prediction disagrees with the given initial prediction.

Further, the microprocessor may be configured to update the second branch prediction information responsive to resolving branch predictions made for branch target cache hits and misses, such that the second branch prediction information reflects branch histories for both branch target cache hits and misses. With that approach, the microprocessor may be configured to update the first branch prediction information as a function of the second branch prediction information. That is, the second branch history table is made to reflect the branch histories of all executed branch instructions, whether or not they are represented in the branch target cache.

Alternatively, the microprocessor may be configured to update the second branch prediction information responsive to resolving branch predictions made for branch target cache misses, and be configured to update the first branch prediction information responsive to resolving branch predictions made for branch target cache hits. With this approach, the first branch history table reflects branch histories for those branch instructions represented within the cache, and the second branch history table reflects branch histories for those branch instructions not represented in the cache.

DESCRIPTION OF EMBODIMENTS OF THE INVENTION

Figure 1:
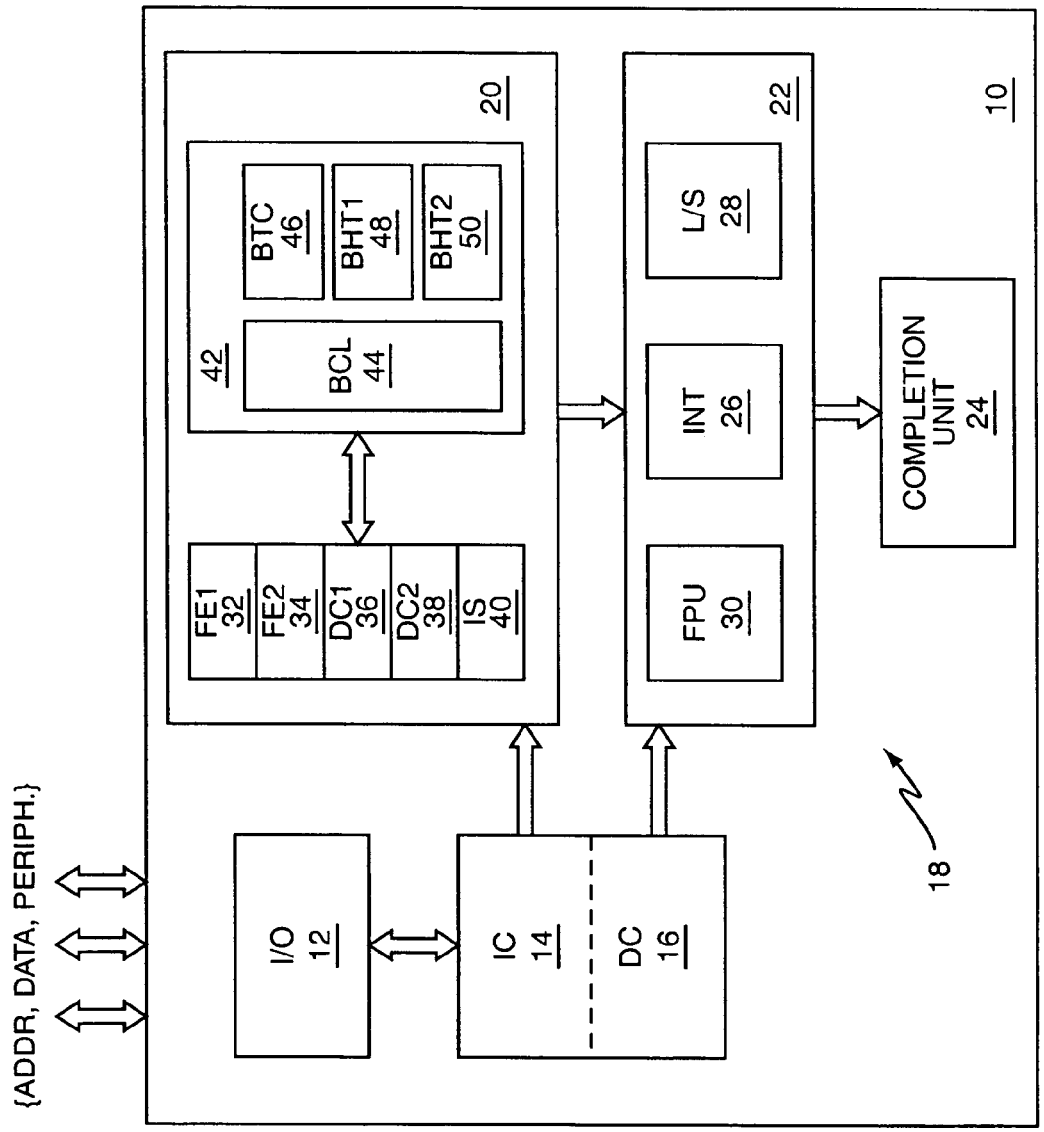
FIG. 1 is a block diagram of a microprocessor.

By way of non-limiting example, FIG. 1 illustrates a microprocessor 10, which may comprise a pipelined RISC microprocessor. In the illustrated embodiment, the microprocessor 10 comprises input/output (I/O) circuits 12, an instruction cache 14, a data cache 16, and an instruction pipeline 18, which comprises a front-end circuit 20, an execution unit 22, and a completion unit 24.

In operation, the front-end circuit 20 fetches instructions from the instruction cache 14, which may be an on-board Level 1 (L1) cache. The instructions are fetched according to a defined computer program flow, which may include program branches or jumps. The microprocessor 10 uses branch prediction to predict whether conditional branches will be taken or not taken, such that it generally does not interrupt its instruction fetching operations when conditional branch instructions are encountered.

Fetched instructions are decoded and issued to the execution unit 22, which can be implemented according to a superscalar architecture. The execution unit 22 executes the issued instructions, and the completion unit 24 retires the executed instructions. The completion unit 24 may comprise a write-back mechanism that stores the execution results in one or more targeted file registers. By way of non-limiting example, the execution unit 22 comprises an integer unit 26, a load/store unit 28, and a floating point unit 30. Thus, the front-end circuit 20 may be configured to dispatch integer instructions to the integer unit 26, memory access instructions to the load/store unit 28, and so on.

Those skilled in the art will appreciate that each such sub-unit within the execution unit 22 itself may comprise a number of sequential pipeline stages, and that the particular sub-units implemented within the execution unit 22 may vary. Indeed, those skilled in the art will appreciate that the architecture of the microprocessor 10 may be varied significantly without departing from the branch prediction methods and apparatus disclosed herein.

Turning to a more detailed treatment of branch prediction according to one embodiment of the microprocessor 10, the front-end circuit 20 comprises a number of pipeline stages, including sequential fetch stages 32 and 34 (also denoted as FE1 and FE2 in the diagram), sequential decode stages 36 and 38 (also denoted as DC1 and DC2 in the diagram) and an issue/dispatch stage 40 (also denoted as IS in the diagram). One or more of these front-end pipeline stages are associated with a branch prediction circuit 42 that comprises branch control logic 44, a branch target cache 46, a first branch history table 48 (also denoted as BHT1 in the diagram), and a second branch history table 50 (also denoted as BHT2 in the diagram).

The fetch stage 32 may be configured to maintain an address counter representing the instruction address of the next instruction to be fetched into the instruction pipeline 18. The value held in the fetch stage 32 is provided to the instruction cache 14, such that the instruction cache 14 outputs the actual program instruction held at the specified address, for decoding by the decode stage 36. The value held in the fetch stage 32 generally is updated at each clock cycle. For sequential fetching, updating the value comprises incrementing it to point to the next program instruction in the current sequence of instructions. However, sequential fetching is not appropriate, if the last instruction fetched is a conditional branch instruction that will be taken. Rather, instruction fetching should be redirected to the target address of the branch instruction.

To that end, the branch prediction circuit 42 uses branch history information to predict whether a given conditional branch instruction will be taken or not taken. Such branch information may be generated according to one or more heuristics. By way of non-limiting example, the branch prediction information may be based on monitoring how many of the last R branches were taken or not taken. Such information may be refined, such as by maintaining separate history information for forward and reverse branches, and/or by maintaining branch history predictors for sub-ranges of the overall program instruction address space, such that each branch predictor reflects the taken/not-taken behavior of a relatively small instruction address range. Restricting each predictor to a smaller range of instruction addresses can provide a more accurate predictor, since the number of branches represented by each predictor is reduced and, presumably, more reflective of the specific behaviors of that smaller number of branches.

However, maintaining a larger number of predictors generally requires a large branch history table, which may reduce the rate at which the table can be accessed. A slower access speed is not problematic in terms of branch instructions that are not recognized (and thus not predicted) until the decode step in the instruction pipeline 18, but is problematic for branch instructions that are recognized as branch instructions early in the instruction pipeline 18, by virtue of the branch target cache 46, which provides the microprocessor 10 the ability to recognize whether a newly fetched instruction is or is not a branch instruction, in advance of that instruction being decoded.

By way of non-limiting examples, that the branch target cache 46 may be implemented as a Branch Target Address Cache (known as a "BTAC"), or as a Branch Target Instruction Cache (known as a "BTIC"). In the first case, the branch target cache 46 stores the instruction addresses of previously identified branch instructions, and stores the corresponding branch target addresses. In the second case, the branch target cache 46 stores the instruction address of previously identified branch instructions, the actual target instructions of those branch instructions, and the next instruction address after the target instruction's address.

Regardless, if a given instruction was previously fetched, decoded, and identified as a conditional branch instruction, its corresponding instruction address can be stored in the branch target cache 46. The branch target cache 46 thus stores the instruction addresses of known branch instructions, and the instruction address of each newly fetched instruction can be compared to the address values held in the branch target cache 46. A comparison match (a branch target cache hit) means that the newly fetched instruction is a known branch instruction, while no match (a branch target cache miss) means that instruction decoding will be required to determine whether the newly fetched instruction is a branch instruction.

Since the stage at which branch instructions are identified based on branch target cache hit detection is earlier than the stage at which branch instructions are identified based on instruction decoding, the branch prediction information used to predict branch instructions that are branch target cache hits must be available more quickly than the branch prediction information used to predict branch instructions that are branch target cache misses. Thus, in at least one embodiment of the microprocessor 10, its branch prediction method comprises maintaining the branch target cache 46 for identification of known branch instructions, determining whether branch instructions fetched into instruction pipeline 18 of the microprocessor 10 are branch target cache hits or branch target cache misses, and predicting branch instructions that are branch target cache hits as taken or not taken according to first branch prediction information stored in the first branch history table 48, and predicting branch instructions that are branch target cache misses as taken or not taken according to second branch prediction information stored in the second branch history table 50.

The method may further comprise configuring the first branch history table 48 to have an access speed matched to that of the branch target cache 46, and configuring the second branch history table 50 to have an access speed matched to that of the instruction cache 14, from which instructions are fetched into the instruction pipeline 18. Generally, the access speed of the instruction cache 14 is such that the actual (fetched) program instruction is provided to the first decode stage 36 at the appropriate instruction clock cycle. As an example, the first branch history table 48 and the branch target cache 46 can be configured to be accessible in M cycles of the instruction pipeline 18, and the second branch history table 50 can be configured to be accessible in N cycles of the instruction pipeline 18, wherein M and N are first and second numbers, with M being less than N.

One method of configuring the first branch history table 48 to be faster than the second branch history table 50 comprises configuring the first branch history table 48 to store a smaller number of branch predictors than the second branch history table 50, such that accessing a branch predictor in the first branch history table 48 takes less time than does accessing a branch predictor in the second branch history table 50. As previously noted, the individual predictors stored in the branch history tables 48 and 50 may comprise saturated counters, e.g., two-bit counters, that provide branch prediction information in the form of an indicator having strongly taken, weakly taken, weakly not taken and strongly not taken states. However, it should be understood that the branch history tables 48 and 50 might adopt a different type of counter, or adopt an altogether different form of branch predictor.

In a further aspect of the two-table branch prediction method outlined above, the microprocessor 10 may be configured to make initial predictions for branch target cache hits according to the first branch prediction information, and make corresponding subsequent predictions for the branch target cache hits according to the second branch prediction information. That is, the microprocessor 10 may be configured to control its instruction fetching for branch target cache hits based on an initial (early) branch prediction made using information stored in the first branch history table 48, and then override such control if the corresponding subsequent branch prediction made using information stored in the second branch history table 50 disagrees with the initial prediction.

In this context, overriding the earlier prediction may comprise redirecting instruction fetching. For example, if the initial prediction is taken, the branch prediction circuit 42 may direct instruction fetching to the indicated branch target address, and, if the subsequent prediction is not taken, the branch prediction circuit may redirect instruction fetching back to the next sequential address after the not-taken branch instruction. There may be advantages to conditionally redirecting (overriding) the earlier branch predictions using the subsequent branch predictions, such as where the second branch history table 50 is larger and, presumably, more accurate than the smaller and faster first branch history table 48.

With the above method, the second branch history table 50 stores prediction information that is used for both branch target cache hits and branch target cache misses. As such, a method of updating the second branch history table 50 comprises updating the second branch prediction information responsive to resolving branch predictions made for branch target cache hits and misses, such that the second branch prediction information reflects branch histories for both branch target cache hits and misses. That is, the execution unit 22 may be configured to provide feedback to the branch prediction circuit 42, as to whether individual branch instructions, for both branch target cache hits and misses, actually are taken or not taken, and that feedback can be used to update the prediction information stored in the second branch history table 50. In turn, the prediction information stored in the first branch history table 48 can be updated as a function of the (updated) second branch prediction information. Equivalently, at least the feedback for branch target cache hits can be provided to the branch prediction circuit 42, for direct use in updating the first branch history table 48.

Another embodiment of the two-table branch prediction method taught herein comprises initiating accesses to the first and second branch history tables 48 and 50 responsive to fetching an instruction address into the instruction pipeline 18, and aborting the access to the second branch history table 50 responsive to detecting that the instruction address is a hit in the branch target cache 46. Thus, the microprocessor 10 initiates accesses to the first and second branch history tables 48 and 50, in conjunction with fetching a new instruction into the instruction pipeline 18. If the newly fetched instruction is detected as a branch target cache hit, the microprocessor 10 aborts the access to the second branch history table 50 as unnecessary.

Aborting that access under such circumstances can save power. For example, the sense amplifiers and/or other output circuits used to output branch prediction results from the second branch history table 50 need not be powered up. Further, initiating accesses to the second branch history table 50 according to the above method, even if some number of those accesses are aborted, insures that needed results will be available in a timely manner, i.e., the access to the second branch history table 50 is initiated early in the instruction pipeline 18, so that prediction results from the second branch history table 50 for branch target cache misses will be ready and available later in the instruction pipeline 18.

This approach allows the first branch history table 48 to store prediction information exclusively for branch instructions that are branch target cache hits, and allows the second branch history table 50 to store prediction information exclusively for branch instructions that branch target cache misses. As such, the method of branch prediction information updating adopted by the microprocessor 10 may comprise updating the second branch prediction information responsive to resolving branch predictions made for branch target cache misses, and updating the first branch prediction information responsive to resolving branch predictions made for branch target cache hits.

In other words, the microprocessor 10 may use feedback from the execution unit 22, to determine whether branch instructions actually are or are not taken. The feedback for branch instructions that were branch target cache hits may be used to update the stored prediction information in the first branch history table 48, and the feedback for branch instructions that were branch target cache misses may be used to update the stored prediction information in the second branch history table 50. Segregating the prediction information in the manner improves the prediction accuracy of the microprocessor 10, at least to the extent that branch target cache hits and misses exhibit different taken/not-taken behaviors.

Figure 2:
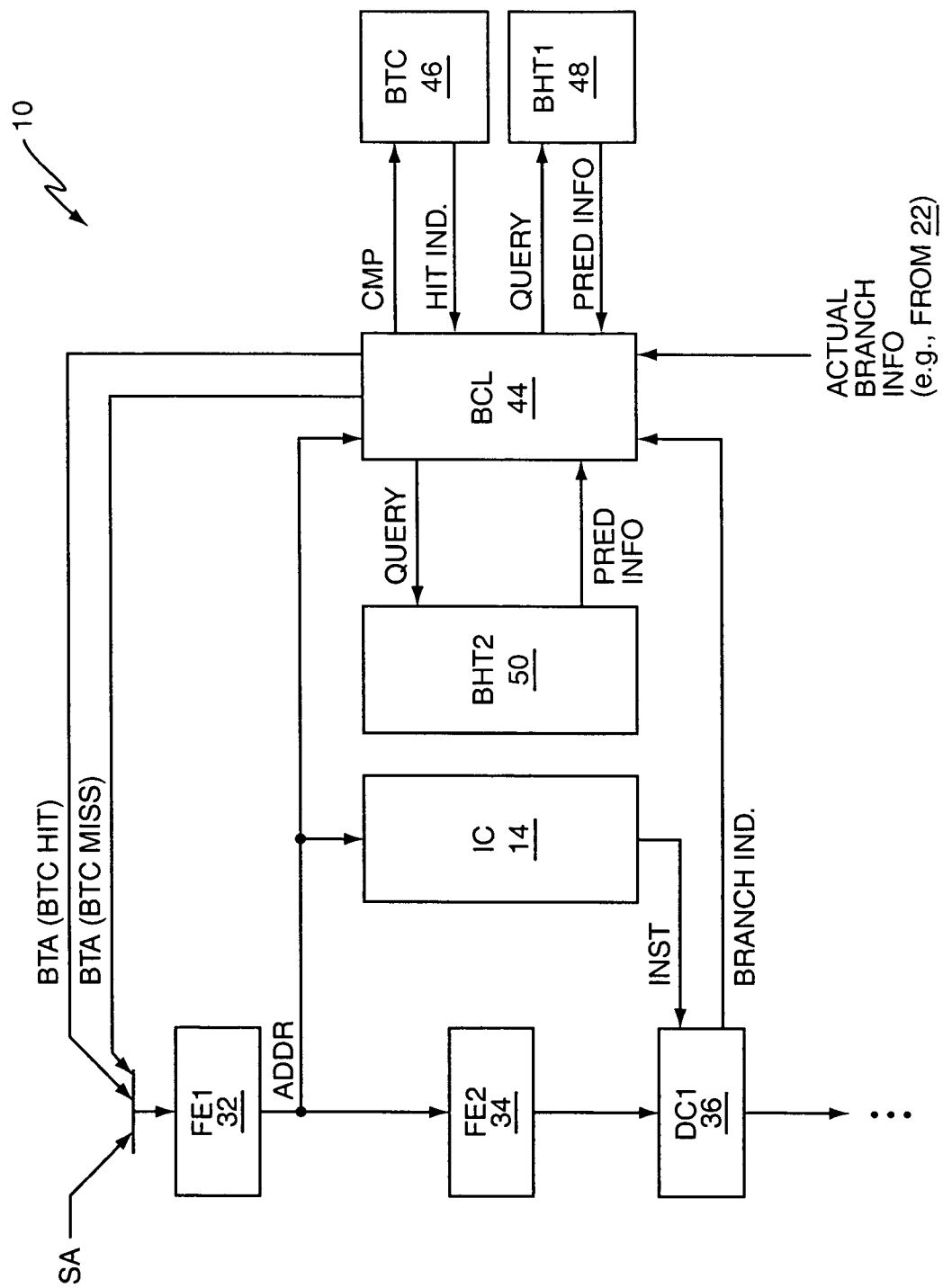
FIG. 2 is a block diagram of a front-end circuit for an instruction pipeline that may be implemented in the microprocessor of FIG. 1.

FIG. 2 provides a functional block diagram of a portion of the microprocessor 10, wherein the illustrated functional elements can be configured to carry out the two-table branch prediction methods taught herein. From the illustration, one sees that the fetch stage 32 of the instruction pipeline 18 provides instruction addresses to the instruction cache 14, and to the branch control logic 44. The instruction cache 14 uses these addresses to fetch the corresponding instruction for output to the decode stage 36 of the instruction pipeline, while the branch control logic 44 compares each fetch address to the branch target cache 46, to detect known branch instructions, i.e., to identify those fetched instruction addresses that match an instruction address stored in the branch target cache 46.

If the branch target cache 46 returns a hit indication to the branch control logic 44, the branch control logic 44 obtains prediction information from the first branch history table 48, to determine whether the branch target cache hit should be predicted as taken or not taken. If the prediction indicator indicates a taken prediction, the branch control logic 44 causes the next fetch address of the fetch stage 32 to be updated with the branch target address of branch cache hit, which is denoted as "BTA (BTC HIT)" in the diagram, to indicate the Branch Target Address (BTA) for a Branch Target Cache (BTC) hit.

Instruction addresses that are branch target cache misses propagate sequentially through the fetch stages 32 and 34, and the instructions corresponding to those addresses are provided by the instruction cache 14 for decoding the decode stage 36. At that point, decoded branch instructions that missed in the branch target cache 46 are recognized, and the branch control logic 44 predicts the branch instructions as taken or not taken using prediction information from the second branch history table 50. If predicted as taken, the branch control logic 44 provides the fetch stage 32 with the corresponding branch target address, denoted as "BTA (BTC MISS)" in the diagram, to indicate the BTA for a BTC miss.

Figure 3:
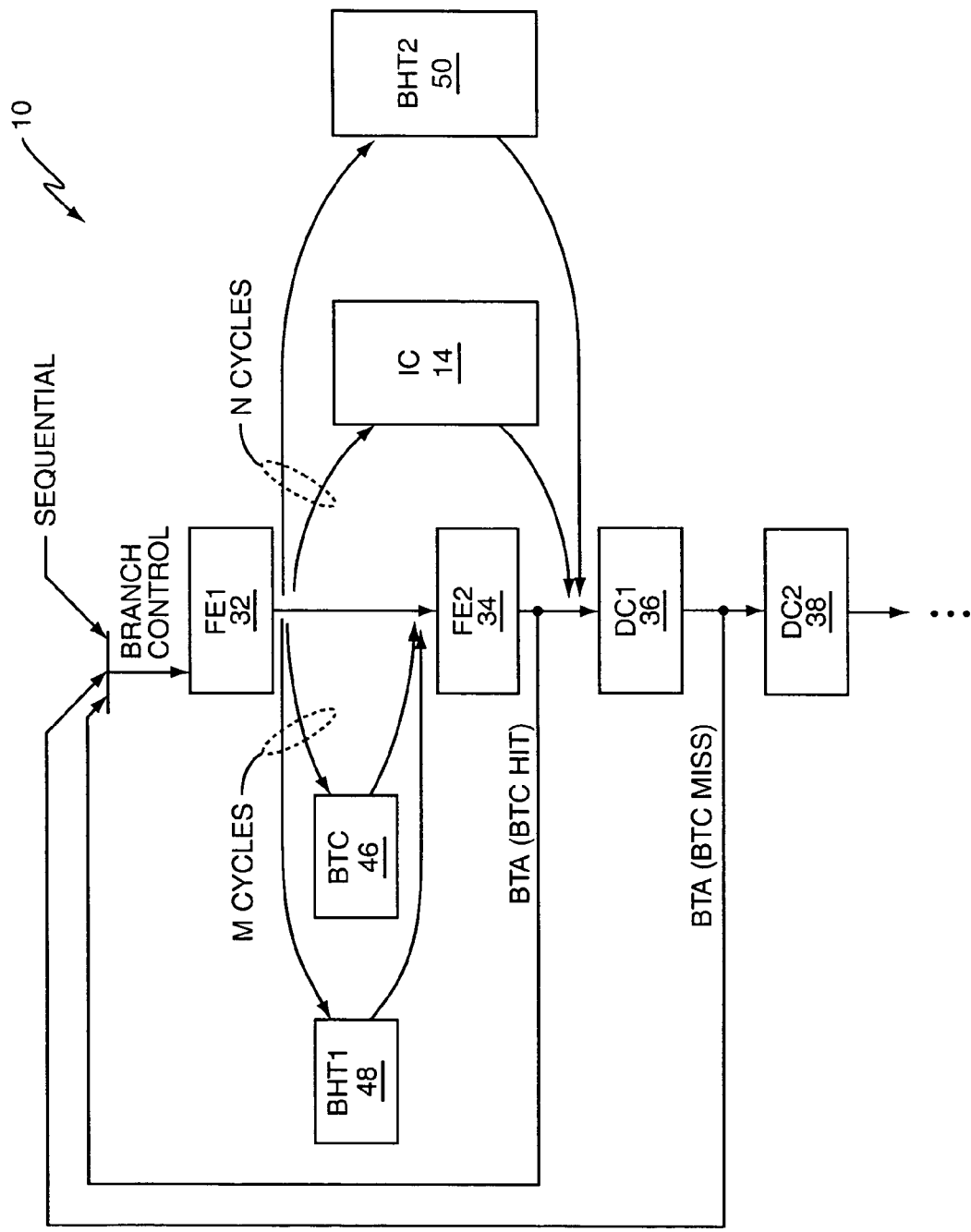
FIG. 3 is a flow diagram of instruction processing for an embodiment of the front-end circuit illustrated in FIG. 2.

FIG. 3 illustrates access cycle timing for one or more embodiments of the above functionality, wherein the first branch history table 48 is configured to have an access speed matched to that of the branch target cache 46. This matching allows the microprocessor 10 to obtain branch prediction information in the same pipeline stage(s) that the microprocessor 10 identifies branch instructions based on detecting branch target cache hits. As an example, the branch target cache 46 and the first branch history table 48 both may be accessible in M cycles of the instruction pipeline 18 (e.g., M instruction clock cycles). That configuration allows the microprocessor 10 to provide branch target addresses to the fetch stage 32 after M+1 cycles, for branch instructions that are branch target cache hits.

Further, the second branch history table 50 may be configured to have an access speed matched to that of the instruction cache 14, or matched to whatever speed is appropriate for the delay between instruction address fetching and the subsequent decoding of the corresponding instruction by the decode stage 36. As an example, the instruction cache 14 and the second branch history table 50 may be configured to be accessible in N cycles of the instruction pipeline 18. That configuration allows the microprocessor 10 to provide branch target addresses to the fetch stage 32 after N+1 cycles, for branch instructions that are branch target cache misses.

By way of non-limiting example, M may be one clock cycle, and N may be two clock cycles. Thus, the microprocessor 10 obtains branch predictions for branch target cache hits in two instruction clock cycles, using the first branch history table 48, which may be relatively small in terms of the number of individual branch predictors it contains, as compared to the second branch history table 50. Further, the microprocessor 10 obtains branch predictions for branch target cache hits in three instruction clock cycles, using the second branch history table 50.

From the above example, one sees that by using a "mini" branch history table (i.e., the first branch history table 48), the microprocessor 10 gains a prediction and fetching performance advantage for branch instructions that are detected as branch target cache hits. Moreover, those performance gains do not come at the expense of maintaining an arbitrarily large and (presumably) more accurate main branch history table (i.e., the second branch history table 50), which may be used for predicting branch instructions that are not branch target cache hits, and/or for overriding initial predictions made from the mini table.

As such, those skilled in the art should appreciate that two-table branch prediction as disclosed herein can be subject to much variation, such as in terms of the microprocessor architecture, the relative instruction cycle access timing differences between the mini and main branch history tables, whether branch target cache hits are exclusively or initially predicted using the mini table, the heuristics and methods chosen for updating the mini and main branch history tables, the particular format of the branch prediction information stored in the mini and main tables, the relative sizes of the mini and main tables, etc. More particularly, those skilled in the art should appreciate that the present invention is not limited by the foregoing discussion, or by the accompanying drawings. Indeed, the present invention is limited only by the following claims and their legal equivalents.

What is claimed is:

1. A microprocessor comprising an instruction pipeline that includes or is associated with:
    an instruction cache configured to cache instructions for fetching into the instruction pipeline;
    a branch target cache configured to store branch target information for known branch instructions;
    a first branch history table configured to store first branch prediction information;
    a second branch history table configured to store second branch prediction information; and
    branch control logic configured to predict branch instructions as taken or not taken according to the first branch prediction information for branch instructions that are branch target cache hits, and according to the second branch prediction information for branch instructions that are branch target cache misses, wherein the microprocessor is configured to initiate accesses to the first and second branch history tables responsive to fetching an instruction address into the instruction pipeline, and further configured to abort the access to the second branch history table responsive to detecting that the instruction address is a hit in the branch target cache, such that a full access of the second branch history table is avoided for branch instructions that are branch target cache hits.

2. The microprocessor of claim 1, wherein the first branch history table is configured to have an access speed matched to that of the branch target cache, and wherein the second branch history table is configured to have an access speed matched to that of the instruction cache.

3. The microprocessor of claim 1, wherein the first branch history table and the branch target cache are configured to be accessible in M cycles of the instruction pipeline, and wherein the second branch history table is configured to be accessible in N cycles of the instruction pipeline, wherein M and N are first and second numbers, with M being less than N.

4. The microprocessor of claim 1, wherein the first branch history table comprises a smaller number of branch predictors than the second branch history table, such that accessing a branch predictor in the first branch history table takes less time than does accessing a branch predictor in the second branch history table.

5. The microprocessor of claim 1, wherein the microprocessor is configured to make initial predictions for branch target cache hits according to the first branch prediction information, and configured to make corresponding subsequent predictions for the branch target cache hits according to the second branch prediction information.

6. The microprocessor of claim 5, wherein the microprocessor is configured to direct instruction fetching according to the initial predictions, and conditionally redirect instruction fetching according to the corresponding subsequent predictions.

7. The microprocessor of claim 6, wherein the microprocessor is configured to conditionally redirect instruction fetching by, for a given initial prediction, redirecting instruction fetching if the corresponding subsequent prediction disagrees with the given initial prediction.

8. The microprocessor of claim 1, wherein the microprocessor is configured to update the second branch prediction information responsive to resolving branch predictions made for branch target cache hits and misses, such that the second branch prediction information reflects branch histories for both branch target cache hits and misses.

9. The microprocessor of claim 8, wherein the microprocessor is configured to update the first branch prediction information as a function of the second branch prediction information.

10. The microprocessor of claim 1, wherein the microprocessor is configured to update the second branch prediction information responsive to resolving branch predictions made for branch target cache misses, and configured to update the first branch prediction information responsive to resolving branch predictions made for branch target cache hits.

11. The microprocessor of claim 1, wherein the branch target cache comprises one of a branch target address cache or a branch target instruction cache.

12. A method of branch prediction in a microprocessor comprising:
    maintaining a branch target cache that identifies known branch instructions;
    determining whether branch instructions fetched into an instruction pipeline of the microprocessor are branch target cache hits or branch target cache misses;
    predicting branch instructions that are branch target cache hits as taken or not taken according to first branch prediction information stored in a first branch history table, and predicting branch instructions that are branch target cache misses as taken or not taken according to second branch prediction information stored in a second branch history table; and
    initiating accesses to the first and second branch history tables responsive to fetching an instruction address into the instruction pipeline, and aborting the access to the second branch history table responsive to detecting that the instruction address is a hit in the branch target cache, such that a full access of the second branch history table is avoided for branch instructions that are branch target cache hits.

13. The method of claim 12, further comprising configuring the first branch history table to have an access speed matched to that of the branch target cache, and configuring the second branch history table to have an access speed matched to that of an instruction cache from which instructions are fetched into the instruction pipeline.

14. The method of claim 12, further comprising configuring the first branch history table and the branch target cache to be accessible in M cycles of the instruction pipeline, and configuring the second branch history table to be accessible in N cycles of the instruction pipeline, wherein M and N are first and second numbers, with M being less than N.

15. The method of claim 12, further comprising configuring the first branch history table to store a smaller number of branch predictors than the second branch history table, such that accessing a branch predictor in the first branch history table takes less time than does accessing a branch predictor in the second branch history table.

16. The method of claim 12, wherein predicting branch instructions that are branch target cache hits as taken or not taken according to first branch prediction information stored in a first branch history table comprises making initial predictions for branch target cache hits according to the first branch prediction information, and making corresponding subsequent predictions for the branch target cache hits according to the second branch prediction information.

17. The method of claim 16, further comprising directing instruction fetching according to the initial predictions, and conditionally redirecting instruction fetching according the corresponding subsequent predictions.

18. The method of claim 17, wherein conditionally redirecting instruction fetching according to the corresponding subsequent predictions comprises, for a given initial prediction, redirecting instruction fetching if the corresponding subsequent prediction disagrees with the given initial prediction.

19. The method of claim 12, further comprising updating the second branch prediction information responsive to resolving branch predictions made for branch target cache hits and misses, such that the second branch prediction information reflects branch histories for both branch target cache hits and misses.

20. The method of claim 19, further comprising updating the first branch prediction information as a function of the second branch prediction information.

21. The method of claim 12, further comprising updating the second branch prediction information responsive to resolving branch predictions made for branch target cache misses, and updating the first branch prediction information responsive to resolving branch predictions made for branch target cache hits.

22. The method of claim 12, further comprising configuring the branch target cache as one of a branch target address cache and a branch target instruction cache.

* * * * *